(12) United States Patent
Rimini et al.

(10) Patent No.: US 9,231,801 B2
(45) Date of Patent: Jan. 5, 2016

(54) ADAPTIVE NON-LINEAR INTERFERENCE CANCELLATION FOR INTERMODULATION DISTORTION

(71) Applicant: QUALCOMM Incorporated, San Diego, CA (US)

(72) Inventors: Roberto Rimini, San Diego, CA (US); Jibing Wang, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 102 days.

(21) Appl. No.: 13/925,651

(22) Filed: Jun. 24, 2013

(65) Prior Publication Data

US 2014/0269857 A1  Sep. 18, 2014

Related U.S. Application Data

(60) Provisional application No. 61/799,907, filed on Mar. 15, 2013.

(51) Int. Cl.
*H04L 27/00* (2006.01)
*H04B 1/10* (2006.01)
*H04W 16/14* (2009.01)

(52) U.S. Cl.
CPC .......... *H04L 27/0008* (2013.01); *H04B 1/1036* (2013.01); *H04W 16/14* (2013.01)

(58) Field of Classification Search
CPC ............................ H04L 27/008; H04B 1/1036
USPC .................................................. 375/219, 285
See application file for complete search history.

(56) References Cited

U.S. PATENT DOCUMENTS

| 7,876,867 | B2 | 1/2011 | Filipovic et al. |
| 8,160,191 | B2 | 4/2012 | Row et al. |
| 8,170,487 | B2 | 5/2012 | Sahota et al. |
| 2011/0103455 | A1 | 5/2011 | Forrester et al. |
| 2012/0140685 | A1 | 6/2012 | Lederer et al. |
| 2012/0140860 | A1 | 6/2012 | Rimini et al. |
| 2013/0044791 | A1* | 2/2013 | Rimini et al. ................. 375/219 |

OTHER PUBLICATIONS

Beidas, "Turbo Volterra Equalization of Intermodulation Distortion in Multicarrier Satellite Systems", MILCOM 2011: Military Communications Conference, pp. 358-363.

* cited by examiner

*Primary Examiner* — Michael Neff
(74) *Attorney, Agent, or Firm* — Holland & Hart LLP

(57) ABSTRACT

A wireless communication device including two or more aggressor transmitters and a victim receiver that is adversely affected by intermodulation distortion (IMD) components associated with the signals transmitted by the two or more aggressor transmitters. Because the aggressor transmitters and the victim receiver are located on the same device, the transmit waveforms that contribute to the IMD components are known and available. More specifically, digital baseband samples used by the aggressor transmitters to generate the transmit waveforms are available. These digital baseband samples are used to reconstruct the IMD component on the wireless device. This reconstructed (estimated) IMD component is provided to the victim receiver, and is subtracted from a signal received by the victim receiver, thereby effectively removing the IMD component present in this received signal. An adaptive filter using a Volterra series can be used to estimate the IMD component in response to the transmitter digital baseband samples.

17 Claims, 4 Drawing Sheets

ADAPTIVE NON-LINEAR INTERFERENCE CANCELLATION FOR INTERMODULATION DISTORTION

RELATED APPLICATION

This application claims priority under 35 U.S.C. §119(e) to U.S. Provisional Application Ser. No. 61/799,907, entitled "Adaptive Non-Linear Interference Cancellation For Intermodulation Distortion", filed on Mar. 15, 2013, which is herein incorporated by reference in its entirety.

FIELD OF THE INVENTION

The present invention relates to a wireless communication device having two or more wireless transmitters and a wireless receiver, wherein the unavoidable non-linearity of the wireless transmitters introduce intermodulation distortion (IMD) to the wireless receiver.

RELATED ART

Multiple radio transmitters may coexist on a single wireless communication device. For example, it is common for a smartphone to include a first transmitter that allows for communication over a wireless local area network (WLAN) (e.g., Wi-Fi), and a second transmitter that allows for communication over a wireless wide area network (WWAN) (e.g., a mobile telecommunication cellular network using technologies such as LTE, WiMAX, UMTS, CDMA, GSM, etc.).

Non-linear operations of two or more transmitters may result in intermodulation distortion (IMD), which can cause sensitivity loss in a receiver located on the same device. For example, simultaneous operation of a WLAN transmitter in the 2.4 GHz band and a WWAN transmitter in the 800 MHz band can result in a second order IMD component (IMD2) that falls into the receive band of a GPS receiver (e.g., 2.4 GHz−800 MHz≈1.6 GHz), thereby resulting in sensitivity loss in the GPS receiver. Similarly, simultaneous operation of a WLAN transmitter in a 5.660 GHz channel and a WWAN transmitter in a 1860 MHz channel can result in a third order IMD component (IMD3) that falls into a 1940 MHz receive channel of a WWAN receiver (e.g., 5660 MHz−2×1860 MHz=1940 MHz), thereby resulting in sensitivity loss in the WWAN receiver.

Typically, a filter for removing all possible known IMD components would be provided at the input of the affected (victim) receiver. However, such a filter is relatively expensive. For the case of LTE uplink (UL) carrier aggregation (CA), the IMD products between the transmitted carriers occur within the same transmitter and may generate undesired distortion close to a victim receiver frequency. For this case, filtering at the victim receiver input is ineffective. It would therefore be desirable to have an improved method and structure for canceling intermodulation distortion in a receiver of a wireless communication device having two or more non-linear transmitters.

SUMMARY

Accordingly, the present invention includes a wireless communication device (e.g., a smart phone) that includes two or more aggressor transmitters and a victim receiver that is adversely affected by IMD components associated with the signals transmitted by the two or more aggressor transmitters. Because the aggressor transmitters and the victim receiver are located on the same device, the transmit waveforms that contribute to the IMD are known (and available). More specifically, the digital samples (i.e., transmit I-Q baseband samples) used by the aggressor transmitters to generate the transmit waveforms are available. These digital samples are used to reconstruct the IMD component at the victim receiver of the wireless device. This reconstructed (estimated) IMD component is provided to the victim receiver, wherein the reconstructed IMD component is subtracted from the signal received by the victim receiver, thereby effectively removing the IMD component present in this received signal.

In a particular embodiment, an adaptive filter using a Volterra series is used to estimate the IMD component in response to the transmit I-Q baseband samples.

The present invention will be more fully understood in view of the following description and drawings.

DETAILED DESCRIPTION

Figure 1:
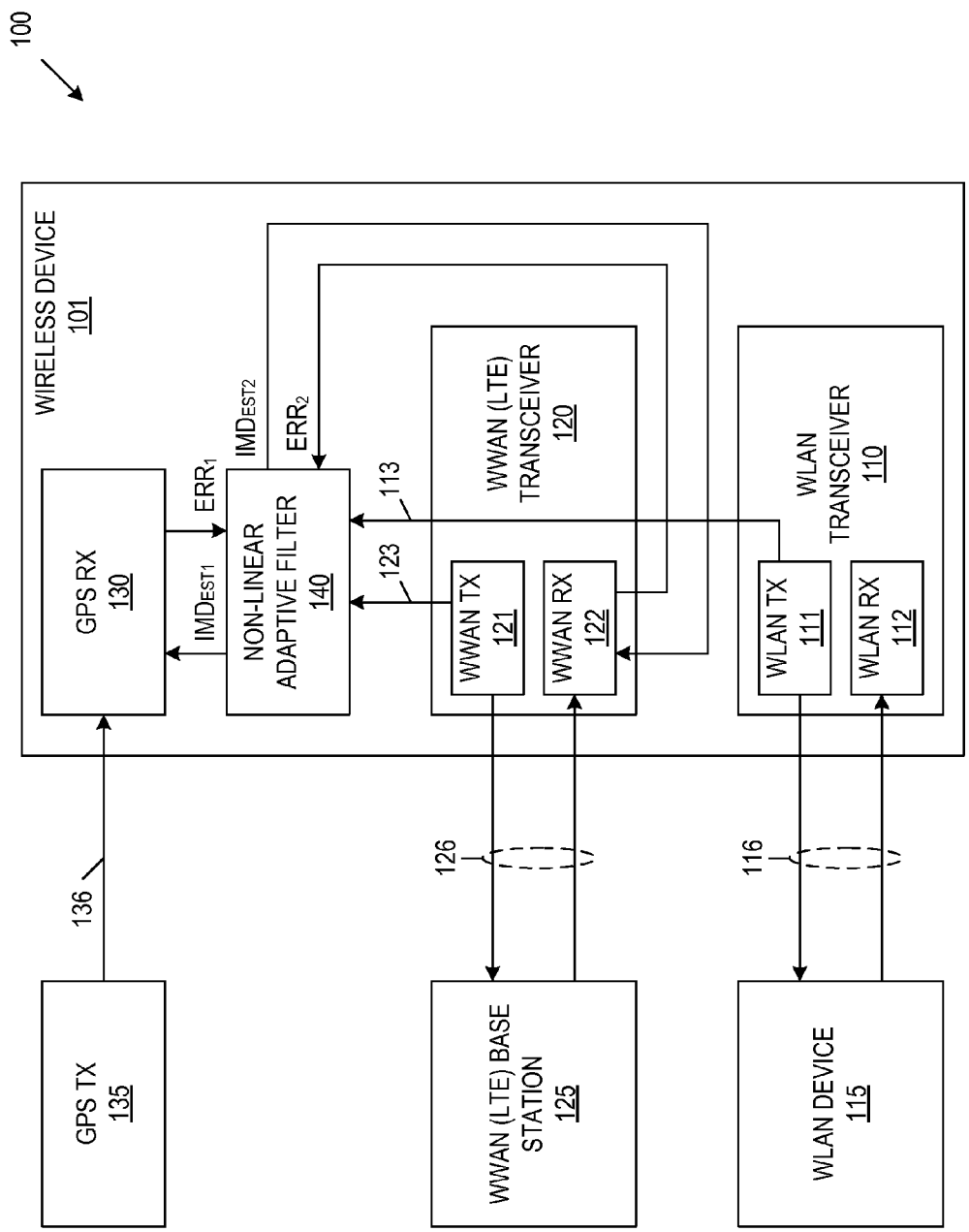
FIG. 1 is a block diagram of a wireless communication system including a wireless communication device in accordance with one embodiment.

FIG. 1 is a block diagram of a wireless communication system 100 including a wireless communication device 101 in accordance with one embodiment of the present invention. Wireless communication device 101 includes a WLAN transceiver 110 (which includes WLAN transmitter circuitry 111 and WLAN receiver circuitry 112), a WWAN transceiver 102 (which includes WWAN transmitter circuitry 121 and WWAN receiver circuitry 122), a GPS receiver 130, and a non-linear adaptive filter 140.

In the described embodiments, wireless communication device 101 is a smartphone, although this is not necessary. WLAN transceiver 110 communicates with an external WLAN device 115 over a first wireless channel 116. WLAN device 115 can be, for example, a wireless access point (AP) or a wireless station (STA), which communicates with WLAN transceiver 110 in accordance with the IEEE 802.11 (Wi-Fi) protocol. WWAN transceiver 120 communicates with WWAN base station 125 over a second wireless channel 126. In the described embodiments, WWAN base station 125 communicates with WWAN transceiver 120 in accordance with a long term evolution (LTE) protocol. However, it is understood that WLAN transceiver 110 and WWAN transceiver 120 can implement other protocols in other embodiments. GPS receiver 130 receives GPS signals on a third wireless channel 136 from external GPS transmitter 135.

In general, wireless device 101 includes at least two transmitter circuits that exhibit non-linear behavior, and at least one receiver circuit that is adversely affected by intermodulation distortion (IMD) introduced by the at least two transmitter circuits. In the examples described in more detail below, WLAN transmitter circuitry 111 and WWAN transmitter circuitry 121 are capable of transmitting on particular frequency bands on channels 116 and 126, respectively, which result in the introduction of IMD to GPS receiver 130. In addition, WLAN transmitter circuitry 111 and WWAN transmitter circuitry 121 are capable of transmitting on particular frequency bands on channels 116 and 126, respectively, which may result in the introduction of IMD to WWAN receiver circuitry 122.

As described in more detail below, non-linear adaptive filter 140 receives digital signals 113 and 123 from WLAN transmitter circuitry 111 and WWAN transmitter circuitry 121, respectively. Digital signals 113 are the baseband signals used within WLAN transmitter circuitry 111 to generate the radio frequency (RF) signals transmitted on wireless channel 116. Similarly, digital signals 123 are the baseband signals used within WWAN transmitter circuitry 121 to generate the RF signals transmitted on wireless channel 126.

Control logic associated with non-linear adaptive filter 140 determines whether the particular RF signals being transmitted by WLAN transmitter circuitry 111 and WWAN transmitter circuitry 121 will introduce IMD components into either GPS receiver 130 or WWAN receiver circuitry 122. More specifically, non-linear adaptive filter 130 determines whether the transmit frequencies implemented by channels 116 and 126 will result in the introduction of IMD components in either GPS receiver 130 or WWAN receiver circuitry 122.

If control logic associated with non-linear adaptive filter 140 determines that the RF signals being transmitted by WLAN transmitter circuitry 111 and WWAN transmitter circuitry 121 will introduce IMD components into the receive path of GPS receiver 130, then this control logic causes non-linear adaptive filter 140 to estimate the IMD components introduced to GPS receiver 130 in response to digital baseband signals 113 received from WLAN transmitter 111 and digital baseband signals 123 received from WWAN transmitter 112. Non-linear adaptive filter 140 provides these estimated IMD components $IMD_{EST1}$ to GPS receiver 130. In response, GPS receiver 130 subtracts the estimated IMD components $IMD_{EST1}$ from a received GPS signal (which includes actual IMD components). An error indication $ERR_1$ is returned to non-linear adaptive filter 140, wherein non-linear adaptive filter 140 adjusts the estimated IMD components $IMD_{EST1}$ in response to the error indication $ERR_1$.

Similarly, if the control logic associated with non-linear adaptive filter 140 determines that the RF signals being transmitted by WLAN transmitter circuitry 111 and WWAN transmitter circuitry 121 will introduce IMD components into the receive path of WWAN receiver circuitry 122, then this control logic causes non-linear adaptive filter 140 to estimate the IMD components introduced to WWAN receiver circuitry 122 in response to the digital baseband signals 113 of WLAN transmitter 111 and the digital baseband signals 123 of WWAN transmitter 112. Non-linear adaptive filter 140 provides these estimated IMD components $IMD_{EST2}$ to WWAN receiver circuitry 122. In response, WWAN receiver circuitry 122 subtracts the estimated IMD components $IMD_{EST2}$ from a received LTE signal (which includes actual IMD components). An error indication $ERR_2$ is returned to non-linear adaptive filter 140, wherein non-linear adaptive filter 140 adjusts the estimated IMD components $IMD_{EST2}$ in response to the error indication $ERR_2$.

In accordance with a particular embodiment of the present invention, non-linear adaptive filter 140 implements a Volterra series to generate the estimated IMD components $IMD_{EST1}$ and $IMD_{EST2}$.

Figure 2:
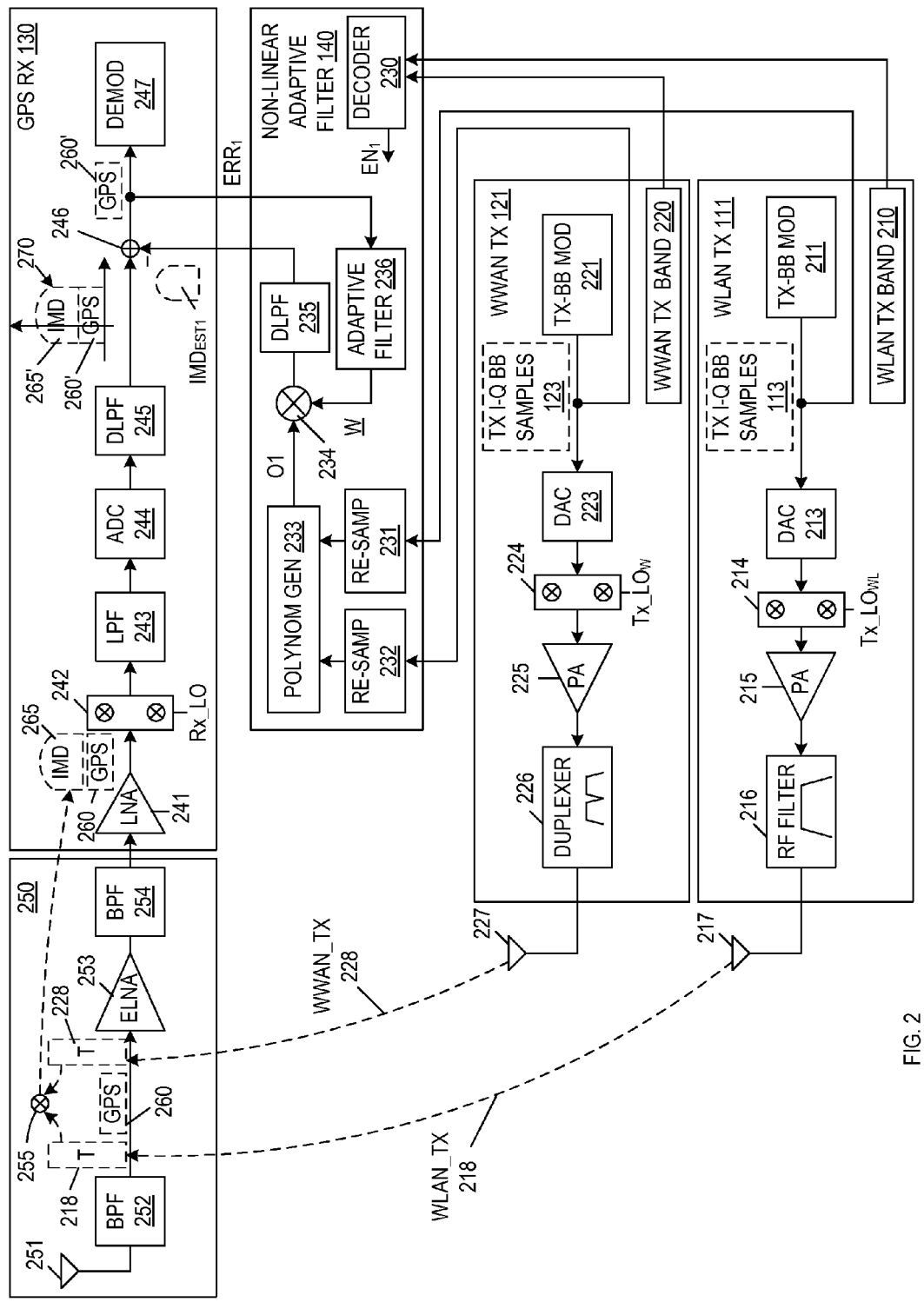
FIG. 2 is a block diagram illustrating portions of WLAN transmitter circuitry, WWAN transmitter circuitry, a GPS receiver and a non-linear adaptive filter of the wireless communication device of FIG. 1, in accordance with one embodiment.

FIG. 2 is a block diagram illustrating portions of WLAN transmitter circuitry 111, WWAN transmitter circuitry 121, GPS receiver 130 and non-linear adaptive filter 140 in accordance with one embodiment of the present invention. In the embodiment illustrated by FIG. 2, WLAN transmitter circuitry 111 and WWAN transmitter circuitry 121 represent 'aggressor' transmitters, and GPS receiver 130 represents a 'victim' receiver.

Within WLAN transmitter circuitry 111, transmit baseband modulator 211 provides the digital I and Q baseband samples 113, which are used to generate a radio frequency (RF) output signal WLAN_TX 218 of WLAN transmitter circuitry 111. More specifically the I-Q baseband samples 113 are converted to analog signals by digital-to-analog converter (DAC) 213. These analog signals are mixed with a transmit local oscillator signal $Tx\_LO_{WL}$ within mixer 214. The resulting signal is transmitted to power amplifier 215 for amplification. The amplified signal is passed through RF filter 216 to antenna structure 217. The resulting transmit signal WLAN_TX 218 is transmitted on the wireless medium to WLAN device 115 (FIG. 1).

Similarly, within WWAN transmitter circuitry 121, transmit baseband modulator 221 provides the digital I and Q baseband samples 123, which are used to generate an RF output signal WWAN_TX 228 of WWAN transmitter circuitry 121. More specifically the I-Q baseband samples 123 are converted to analog signals by DAC 223. These analog signals are mixed with a transmit local oscillator signal $Tx\_LO_W$ within mixer 224. The resulting signal is transmitted to power amplifier 225 for amplification. The amplified signal is passed through radio frequency (RF) duplexer 226 to antenna structure 227. The resulting transmit signal WWAN_TX 228 is transmitted on the wireless medium to WWAN base station 125 (FIG. 1).

Transmit signals WLAN_TX 218 and WWAN_TX 228 are introduced into receiver circuitry 250 associated with GPS receiver 130. Transmit signals WLAN_TX 218 and WWAN_TX 228 can intermodulate in the external low noise amplifier (ELNA) 253 (as illustrated by multiplier operator element 255) of receiver circuitry 250, thereby introducing an analog IMD component 265 into the receive path of GPS receiver 130.

As illustrated by FIG. 2, receiver circuitry 250 includes an antenna structure 251, a first bandpass filter (BPF) 252, an external low noise amplifier (ELNA) 253 and a second band pass filter 254, which are designed to receive and condition a GPS signal (GPS) 260 transmitted from GPS transmitter 135 (FIG. 1). Thus, receiver circuitry 250 also provides the received analog GPS signal 260 to GPS receiver 130. In the above-described manner, the IMD component 265 overlaps with the received GPS signal 260.

The received GPS signal 260 and IMD component 265 provided to GPS receiver 120 are processed by low noise amplifier (LNA) 241, mixer 242, low pass filter 232, analog-to-digital converter (ADC) 244 and digital low pass filter (DLPF) 245 in a manner known in the art, thereby providing digital baseband I-Q samples 270, which include both a GPS component 260' associated with the received GPS signal 260, an IMD component 265' associated with the IMD component 265. Digital baseband I-Q samples 270 are provided to subtraction circuit 246.

As described in more detail below, non-linear adaptive filter 140 provides an estimated IMD component $IMD_{EST1}$ to subtraction circuit 246, wherein the subtraction circuit 246 subtracts the estimated IMD component $IMD_{EST1}$ from the digital baseband I-Q samples 270 provided by DLPF 245. Ideally, the estimated IMD component $IMD_{EST1}$ will match the actual IMD component 265', such that the subtraction circuit 246 provides digital baseband I-Q samples representative of the GPS component 260' to the demodulator and decoder circuitry 247 of GPS receiver 130.

The manner in which non-linear adaptive filter 140 generates the estimated IMD component $IMD_{EST1}$ will now be described. A decoder 230 is coupled to receive WLAN transmit band information 210 from WLAN transmitter circuitry 111, and WWAN transmit band information 220 from WWAN transmit circuitry 221. WLAN transmit band information 210 identifies the channel 116 (e.g., frequency band) on which WLAN transmitter circuitry 111 is transmitting. Similarly, WWAN transmit band information 220 identifies the channel 126 (e.g., frequency band) on which WWAN transmitter circuitry 112 is transmitting. In response, decoder 230 determines whether the transmit frequency bands being used by WLAN transmit circuitry 111 and WWAN transmit circuitry 121 will result in the formation of harmful IMD components (e.g., IMD component 265) within GPS receiver 130. For example, decoder 230 may determine that harmful IMD components will form within GPS receiver 130 if WLAN transmit circuitry 111 transmits in a 2.4 GHz band (e.g., at 2.412 GHz), WWAN transmitter circuitry 121 transmits in an 800 MHz band (e.g., at 835 MHz), and GPS receiver 130 receives in a 1.574 GHz band. For this channel configuration, the resulting second order IMD frequency (IMD2) is equal to 2412−835=1577 MHz. If decoder 230 determines that harmful IMD components will be introduced to GPS receiver 130, then decoder 230 activates a first enable signal $EN_1$, which activates the elements of non-linear adaptive filter 140 used to generate the estimated IMD component $IMD_{EST1}$. If decoder 230 determines that no harmful IMD components will be introduced into GPS receiver 130 (in response to the received transmit band information 210 and 220) then decoder 230 does not activate the first enable signal $EN_1$, and the elements of non-linear adaptive filter 140 used to generate the estimated IMD component $IMD_{EST1}$ are not enabled, advantageously resulting in power savings within wireless device 101.

The elements of non-linear adaptive filter 140 used to generate the estimated IMD component $IMD_{EST1}$ include resampling circuits 231-232, polynomial generator 233, multiplier circuit 234, digital low pass filter 235 and adaptive filter 236. Digital baseband I-Q samples 113 and 123 are provided to resampling circuits 231 and 232, respectively, within non-linear adaptive filter 140. Resampling circuits 231 and 232 resample the digital baseband I-Q samples 113 and 123, respectively, to correspond with the receive sampling rate implemented by GPS receiver 130. In the described example, the resampling rate implemented by resampling circuits 231 and 231 is selected in response to the activated enable signal $EN_1$. That is, because the activated enable signal $EN_1$ identifies the existence of IMD within GPS receiver 130, the activated enable signal $EN_1$ causes resampling circuits 231 and 232 to use a resampling rate corresponding with the known receive frequency of GPS receiver 130. The resampled digital baseband I-Q samples are provided from resampling circuits 231-232 to polynomial generator 233.

Polynomial generator 233 uses a Volterra series, including a plurality of Volterra kernels, to model the non-linearity mechanism as observed in GPS receiver 130 (which is second order intermodulation distortion (IMD2) in the present example). Polynomial generator 233 constructs a Volterra series from the resampled digital baseband I-Q samples to estimate the IMD component 265' introduced to GPS receiver 130. The polynomials of the Volterra series are selected within polynomial generator 233 in response to the activated enable signal $EN_1$, which identifies the IMD2 mechanism. In response, polynomial generator 233 provides output samples O1 that represent 'N' orders of IMD estimation components, consistent with the selected Volterra series polynomials. The output samples O1 of polynomial generator 233 are provided to multiplier circuit 234.

Multiplier circuit 234 is also coupled to receive a set of weight estimation values W from adaptive filter 236. Weight estimation values W estimate the coefficients of the Volterra series modeled by polynomial generator 233. Multiplier circuit 234 multiplies the output samples O1 provided by the polynomial generator 233 by the set of estimated weight values W, and the result is routed through a digital low pass filter 235 to provide the estimated IMD component $IMD_{EST1}$, wherein the bandwidth of DLPF 235 is selected to correspond with the bandwidth of GPS receiver 130, in response to the activated enable signal $EN_1$.

As described above, the estimated IMD component $IMD_{EST1}$ is applied to subtraction circuit 246 of GPS receiver 130, wherein the estimated IMD component $IMD_{EST1}$ is subtracted from the composite digital baseband I-Q samples 270. The resulting post cancellation digital baseband I-Q samples are fed back from subtraction circuit 246 to adaptive filter 236 as the error signal $ERR_1$. These post cancellation samples are also fed into demodulator 247 for further demodulation operations. Adaptive filter 235 adjusts the weight estimation values W (e.g., Volterra series coefficients) in response to the received error signal $ERR_1$, such that the estimated IMD component $IMD_{EST1}$ more accurately represents the IMD component 265' present in digital baseband I-Q samples 270. Note that the operation of adaptive filter 236 is specified, at least in part, by the activation of the $EN_1$ signal, which identifies the IMD mechanism. In the described embodiments, the cost function selected for the weight estimation implemented by adaptive filter 236 is based on the Mean Square Error (MSE) and can be minimized using (but not limited to) a least square (LS), Recursive Least Square (RLS), or Least Mean Square (LMS) algorithm. This process is repeated until the estimated IMD component $IMD_{EST1}$ is substantially identical to the actual IMD component 265', whereby the output of subtraction circuit 246 accurately represents the received GPS signal 260.

Figure 3:
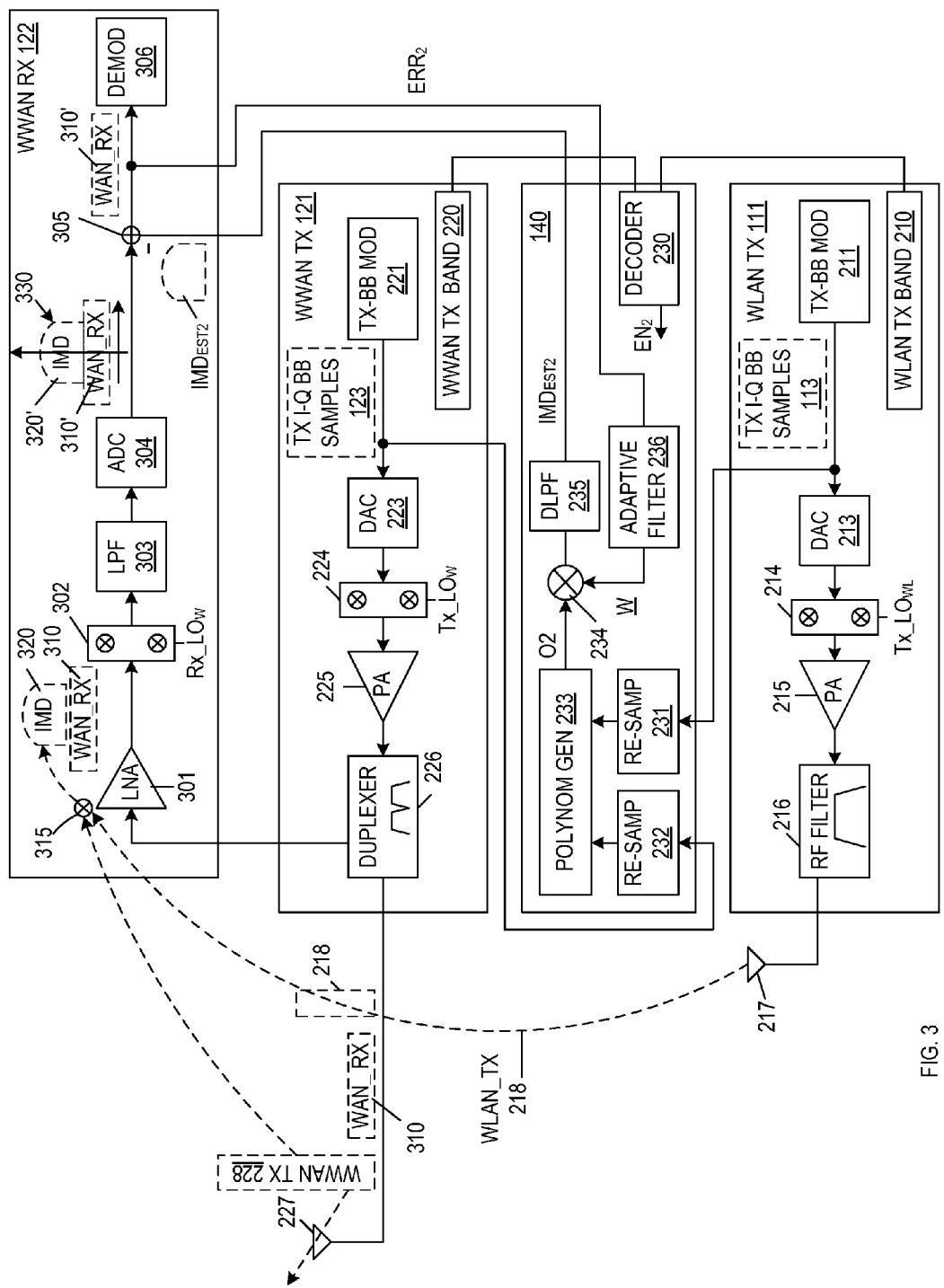
FIG. 3 is a block diagram illustrating portions of WLAN transmitter circuitry, WWAN transmitter and receiver circuitry, and a non-linear adaptive filter of the wireless communication device of FIG. 1, in accordance with one embodiment.

As described above in connection with FIG. 1, harmful IMD components may also be introduced into WWAN receiver circuitry 122 in response to the signals transmitted by WLAN transmitter circuitry 111 and WWAN transmitter circuitry 121. FIG. 3 is a block diagram illustrating portions of WLAN transmitter circuitry 111, WWAN transmitter circuitry 121, WWAN receiver circuitry 122 and non-linear adaptive filter 140, wherein non-linear adaptive filter 140 generates estimated IMD components $IMD_{EST2}$ to cancel IMD components induced by strong WWAN transmit leakage and WLAN transmit coupling as they intermodulate in WWAN receiver circuitry 122 (e.g., LNA 301).

In the embodiment illustrated by FIG. 3, WLAN transmitter circuitry 111 and WWAN transmitter circuitry 121 represent 'aggressor' transmitters, and WWAN receiver circuitry 122 represents a 'victim' receiver. Similar elements in FIGS. 2 and 3 are labeled with similar reference numbers.

WLAN transmitter circuitry 111 provides RF transmit signal WLAN_TX 218 in response to digital I-Q baseband samples 113 in the manner described above in connection with FIG. 2. Similarly, WWAN transmitter circuitry 121 provides RF transmit signal WWAN_TX 228 in response to digital I-Q baseband samples 123 in the manner described above in connection with FIG. 2.

Transmit signal WLAN_TX 218 is introduced onto the transmit/receive antenna structure 227 of WWAN transceiver 120 due to limited antenna to antenna isolation. Transmit signals WLAN_TX 218 and WWAN_TX 228 leak through the duplexer 226 and may intermodulate (as illustrated by multiplier operator element 315) as a result of the limited linearity of LNA 301, thereby introducing an analog IMD component 320 that enters WWAN receiver circuitry 122.

As illustrated by FIG. 3, transmit/receive antenna structure 227 also receives a WWAN signal (WAN_RX) 310, which is transmitted from WWAN base station 125 (FIG. 1). Duplexer 226 also provides the received WWAN_RX signal 310 to WWAN receiver circuitry 122. In the above-described manner, the IMD component 320 overlaps with the received WWAN signal 310.

The received WWAN signal 310 and IMD component 320 are provided to WWAN receiver circuitry 122 and are processed by mixer 302, low pass filter 303, and analog-to-digital converter 304 in a manner known in the art, thereby providing digital baseband I-Q samples 330, which include both a WWAN component 310' associated with the received WWAN signal 310, an IMD component 320' associated with the IMD component 320. Digital baseband I-Q samples 330 are provided to subtraction circuit 305.

Non-linear adaptive filter 140 provides an estimated IMD component $IMD_{EST2}$ to subtraction circuit 305, wherein the subtraction circuit 305 subtracts the estimated IMD component $IMD_{EST2}$ from the digital baseband I-Q samples 330 provided by ADC 304. Ideally, the estimated IMD component $IMD_{EST2}$ matches the actual IMD component 320, such that the subtraction circuit 305 provides digital baseband I-Q samples representative of the WWAN component 310' to the demodulator and decoder circuitry 306 of WWAN receiver circuitry 122.

Non-linear adaptive filter 140 generates the estimated IMD component $IMD_{EST2}$ in the same manner that estimated IMD component $IMD_{EST1}$ was generated. However, various processing parameters of non-linear adaptive filter 140 are modified to reflect the fact that the estimated IMD component $IMD_{EST2}$ has different characteristics than the estimated IMD component $IMD_{EST1}$.

The manner in which non-linear adaptive filter 140 generates the estimated IMD component $IMD_{EST2}$ will now be described. As described above in connection with FIG. 2, decoder 230 is coupled to receive WLAN transmit band information 210 and WWAN transmit band information 220. In response, decoder 230 determines whether the transmit frequency bands being used by WLAN transmit circuitry 111 and WWAN transmit circuitry 121 will result in the formation of harmful IMD components (e.g., IMD component 320) within WWAN receiver circuitry 122. For example, decoder 230 may determine that harmful IMD components will form within WWAN receiver circuitry 122 if WLAN transmit circuitry 111 transmits at 5.660 GHz, WWAN transmitter circuitry 121 transmits at 1860 MHz, and WWAN receiver circuitry 122 receives at 1940 MHz. In this scenario, decoder 230 determines that harmful third order IMD components (IMD3) will be introduced to WWAN receiver circuitry 122, because 5660 MHz−(2×1860 MHz)=1940 MHz. In response, decoder 230 activates a second enable signal $EN_2$, which activates the elements of non-linear adaptive filter 140 used to generate the estimated IMD3 component, $IMD_{EST2}$. If, for different channel assignments, decoder 230 determines that no harmful IMD components will be introduced into WWAN receiver circuitry 122, then decoder 230 does not activate the second enable signal $EN_2$, and the elements of non-linear filter 140 used to generate the estimated IMD component $IMD_{EST2}$ are not enabled, advantageously resulting in power savings within wireless device 101.

The elements of non-linear adaptive filter 140 used to generate the estimated IMD3 component $IMD_{EST2}$ include resampling circuits 231-232, polynomial generator 233, multiplier circuit 234, DLPF 235 and adaptive filter 236, which have been described above in connection with FIG. 2. Digital baseband I-Q samples 113 and 123 are provided to resampling circuits 231 and 232, respectively. In response to the activated second enable signal $EN_2$, resampling circuits 231 and 232 resample the received digital baseband I-Q samples 113 and 123 to correspond with the receive sampling rate implemented by WWAN receiver circuitry 122. These resampled digital baseband I-Q samples are provided from resampling circuits 231 and 232 to polynomial generator 233. In a manner similar to that described above in connection with FIG. 2, polynomial generator 233 constructs a Volterra series from the digital baseband I-Q samples 113 and 123 to reconstruct the IMD component 320' introduced into the WWAN receiver circuitry 122. The polynomials of the Volterra series are selected within polynomial generator 233 in response to the activated enable signal $EN_2$, which identifies the IMD3 conditions and characteristics. In response, polynomial generator 233 provides output samples O2, which represent 'N' orders of IMD3 estimation components to multiplier circuit 234.

Multiplier circuit 234 is also coupled to receive a set of weight estimation values W from adaptive filter 236. Weight estimation values W represent the coefficients of the Volterra series modeled by polynomial generator 233. Multiplier circuit 234 multiplies the output samples O2 provided by the polynomial generator 233 by the set of weight estimation values W, and the result is routed through digital low pass filter 235 to provide the estimated IMD component $IMD_{EST2}$, wherein the bandwidth of DLPF 235 is selected to correspond with the bandwidth of the composite digital baseband I-Q samples 330 within WWAN receiver circuitry 122, in response to the activated enable signal $EN_2$.

As described above, the estimated IMD3 component $IMD_{EST2}$ is applied to subtraction circuit 305 of WWAN receiver circuit 122, wherein the estimated IMD component $IMD_{EST2}$ is subtracted from the digital baseband I-Q samples 330. The resulting digital baseband I-Q samples are fed back from subtraction circuit 305 to adaptive filter 236 as the error signal $ERR_2$. Adaptive filter 235 adjusts the weight estimation values W (e.g., Volterra series coefficients) in response to the received error signal $ERR_2$, such that the estimated IMD component $IMD_{EST2}$ more accurately represents the IMD component 320' present in digital baseband I-Q samples 330. This process is repeated until the estimated IMD component $IMD_{EST2}$ is substantially identical to the actual IMD component 320', whereby the output of subtraction circuit 305 accurately represents the received WWAN signal 310.

Figure 4:
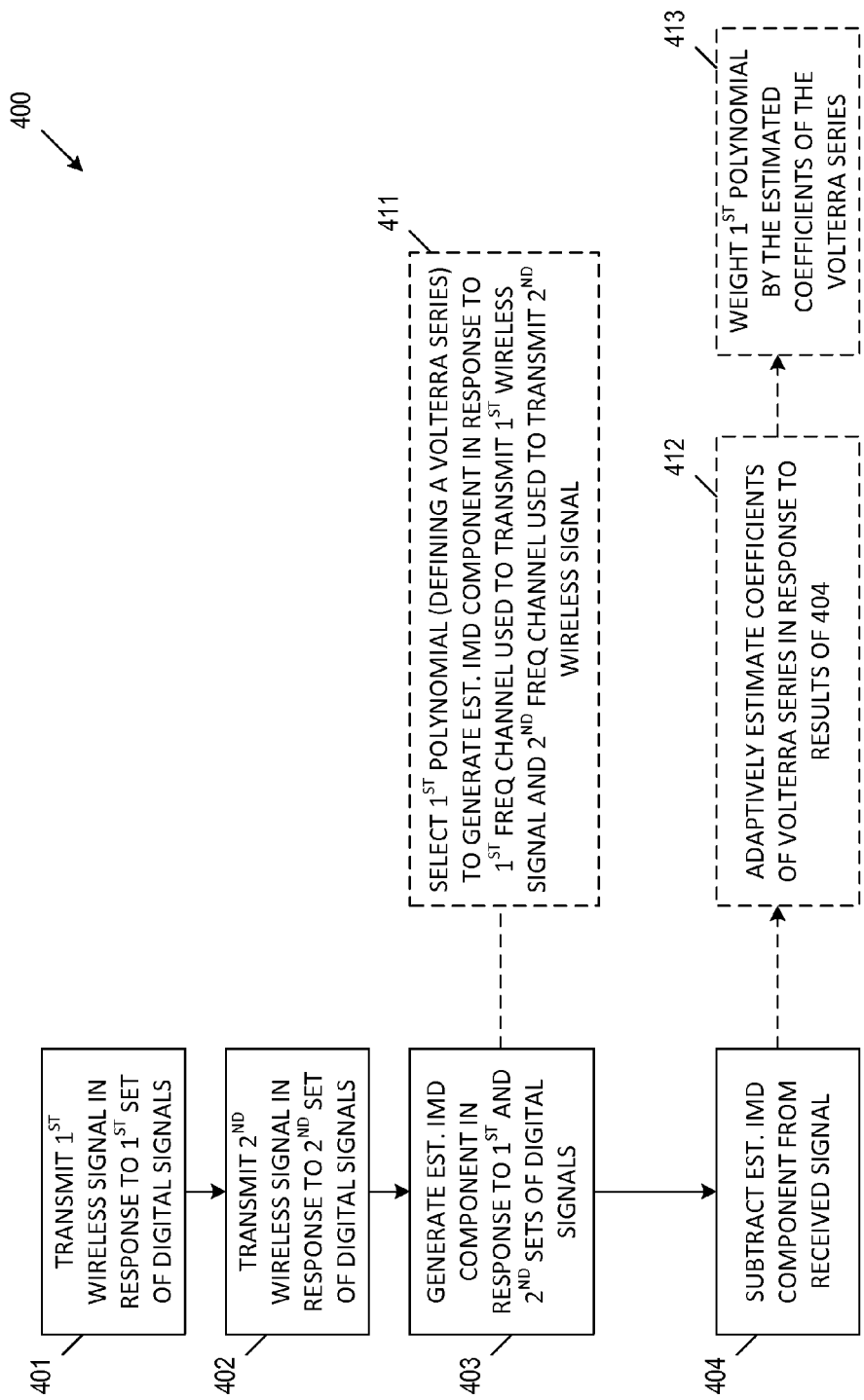
FIG. 4 is a flow diagram illustrating a method of operating a wireless communication device in accordance with one embodiment.

FIG. 4 is a flow diagram 400 illustrating a method of operating a wireless communication device (e.g., wireless device 101) in accordance with one embodiment. At 401, the wireless device transmits a first wireless signal (e.g., WLAN_TX 218) in response to a first set of digital signals (e.g., TX I-Q BB samples 113). At 402, the wireless device transmits a second wireless signal (e.g., WWAN_TX 228) in response to a second set of digital signals (e.g., TX I-Q BB samples 123), wherein the first and second wireless signals introduce an intermodulation distortion (IMD) component in a receiver (e.g., GPS RX 130 or WWAN RX 122), such that a received signal of the receiver includes the IMD component.

At 403, the wireless device generates an estimated IMD component (e.g., $IMD_{EST1}$ or $IMD_{EST2}$) in response to the first and second sets of digital signals. At 404, the wireless device subtracts the estimated IMD component from the received signal of the receiver, thereby canceling at least a portion of the introduced IMD component in the received signal.

In one embodiment, 403 includes selecting a first polynomial used to generate the estimated IMD component in response to a first frequency channel (e.g., WLAN TX band 210) used to transmit the first wireless signal and a second frequency channel (e.g., WWAN TX band 220) used to transmit the second wireless signal (See, 411). The first polynomial selected by 411 may define a specific Volterra series in the manner described above. In another embodiment, subtracting the estimated IMD component from the received signal (404) results in a baseband signal (e.g., $ERR_1$ or $ERR_2$), and the method further includes adaptively estimating coefficients of the specific Volterra series defined by 411 in response to this baseband signal (See, 412). In this embodiment, the first polynomial selected by 411 is weighted by the estimated coefficients of the specific Volterra series determined during 412 (See, 413).

Those of skill in the art would understand that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

Those of skill would further appreciate that the various illustrative logical blocks, modules, circuits, and algorithm steps described in connection with the embodiments disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure.

The various illustrative logical blocks, modules, and circuits described in connection with the embodiments disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The steps of a method or algorithm described in connection with the embodiments disclosed herein may be embodied directly in hardware, in a software module executed by a processor, or in a combination of the two. A software module may reside in RAM memory, flash memory, ROM memory, EPROM memory, EEPROM memory, registers, hard disk, a removable disk, a CD-ROM, or any other form of storage medium known in the art. An exemplary storage medium is coupled to the processor such that the processor can read information from, and write information to, the storage medium. In the alternative, the storage medium may be integral to the processor. The processor and the storage medium may reside in an ASIC. The ASIC may reside in a user terminal. In the alternative, the processor and the storage medium may reside as discrete components in a user terminal.

In one or more exemplary embodiments, the functions described may be implemented in hardware, software, firmware, or any combination thereof. If implemented in software, the functions may be stored on or transmitted over as one or more instructions or code on a computer-readable medium. Computer-readable media includes both computer storage media and communication media including any medium that facilitates transfer of a computer program from one place to another. A storage media may be any available media that can be accessed by a computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. In addition, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, includes compact disc (CD), laser disc, optical disc, digital versatile disc (DVD), floppy disk, and Blu-Ray disc where disks usually reproduce data magnetically, while discs reproduce data optically with lasers. Combinations of the above should also be included within the scope of computer-readable media.

The previous description of the disclosed embodiments is provided to enable any person skilled in the art to make or use the present disclosure. Various modifications to these embodiments will be readily apparent to those skilled in the art, and the generic principles defined herein may be applied to other embodiments without departing from the spirit or scope of the disclosure. Thus, the present disclosure is not intended to be limited to the embodiments shown herein but is to be accorded the widest scope consistent with the principles and novel features disclosed herein.

We claim:
1. A method comprising:
   transmitting a first wireless signal from a first wireless transmitter of a wireless device based at least in part on a first set of digital signals;
   transmitting a second wireless signal from a second wireless transmitter of the wireless device based at least in part on a second set of digital signals;
   estimating an intermodulation distortion (IMD) component of a signal received at a first receiver of the wireless device caused by the transmissions of the first wireless signal and the second wireless signal;
   subtracting the estimated IMD component of the signal received at the first receiver from the signal received at the first receiver;
   transmitting a third wireless signal based at least in part on a third set of digital signals;

estimating an IMD component of a signal received at a second receiver of the wireless device caused by the transmissions of the first wireless signal and the third wireless signal; and subtracting the estimated IMD component of the signal received at the second receiver from the signal received at the second receiver.

2. The method of claim 1, wherein subtracting the estimated IMD component of the signal received at the first receiver from the signal received at the first receiver reduces an effect of the IMD component of the signal received at the first receiver on a demodulation of the signal received at the first receiver.

3. The method of claim 1, wherein estimating the IMD component of the signal received at the first receiver comprises selecting a first polynomial to be used to estimate the IMD component of the signal received at the first receiver, wherein selection of the first polynomial is based at least in part on a first frequency channel used to transmit the first wireless signal and a second frequency channel used to transmit the second wireless signal.

4. The method of claim 3, wherein the first polynomial defines a specific Volterra series.

5. The method of claim 4, wherein the specific Volterra series represents at least one from the group consisting of:
a second order intermodulation distortion mechanism, and
a third order intermodulation distortion mechanism.

6. The method of claim 4, wherein subtracting the estimated IMD component of the signal received at the first receiver from the signal received at the first receiver results in a baseband signal, the method further comprising adaptively estimating coefficients of the specific Volterra series based at least in part on the baseband signal.

7. The method of claim 6, wherein estimating the IMD component of the signal received at the first receiver comprises weighting the first polynomial by the estimated coefficients of the specific Volterra series.

8. The method of claim 1, further comprising:
transmitting a fourth wireless signal based at least in part on a fourth set of digital signals; and
estimating an IMD component of a second signal received at the second receiver caused by the transmissions of the third wireless signal and the fourth wireless signal; and
subtracting the estimated IMD component of the second signal received at the second receiver from the second signal received at the second receiver.

9. A wireless device comprising:
a first transmitter to transmit a first wireless signal based at least in part on a first set of digital signals;
a second transmitter to transmit a second wireless signal based at least in part on a second set of digital signals;
wherein the first transmitter is further configured to transmit a third wireless signal based at least in part on a third set of digital signals;
a first receiver to receive a signal, wherein transmissions of the first wireless signal and the second wireless signal introduce an intermodulation distortion (IMD) component to the signal received at the first receiver;
a non-linear adaptive filter to estimate the IMD component of the signal received at the first receiver;

a first subtracter to subtract the estimated IMD component of the signal received at the first receiver from the signal received at the first receiver;
a second receiver to receive a signal, wherein transmissions of the first wireless signal and the third wireless signal introduce an IMD component to the signal received at the second receiver;
wherein the non-linear adaptive filter is to estimate the IMD component of the signal received at the second receiver; and
a second subtracter to subtract the estimated IMD component of the signal received at the second receiver from the signal received at the second receiver.

10. The wireless device of claim 9, wherein the non-linear adaptive filter includes a polynomial generator to provide a first polynomial to be used to estimate the IMD component of the signal received at the first receiver.

11. The wireless device of claim 10, wherein the polynomial generator comprises a programmable subset of the Volterra series.

12. The wireless device of claim 10, wherein the first polynomial defines a Volterra series.

13. The wireless device of claim 12, wherein the first subtracter is to provide a baseband signal to an adaptive filter of the non-linear adaptive filter, wherein the baseband signal is a resulting signal from subtracting the estimated IMD component of the signal received at the first receiver from the signal received at the first receiver.

14. The wireless device of claim 13, wherein the adaptive filter is to provide estimated coefficients of the Volterra series based at least in part on the baseband signal.

15. The wireless device of claim 14, further comprising:
a controller to:
receive information identifying a first frequency channel used to transmit the first wireless signal and a second frequency channel used to transmit the second wireless signal; and
enable the non-linear adaptive filter to estimate the IMD component of the signal received at the first receiver, wherein the estimation is based at least in part on the first frequency channel and the second frequency channel.

16. The wireless device of claim 15, wherein the controller is further configured to combine the first polynomial with the estimated coefficients of the Volterra series.

17. The wireless device of claim 9, wherein:
the second transmitter is further configured to transmit a fourth wireless signal based at least in part on a fourth set of digital signals;
transmissions of the third wireless signal and the fourth wireless signal introduce an IMD component to a second signal received at the second receiver;
the non-linear adaptive filter is to estimate the IMD component of the second signal received at the second receiver; and
the second subtracter is to subtract the estimated IMD component of the second signal received at the second receiver from the second signal received at the second receiver.

* * * * *